(12) United States Patent
Matsudaira et al.

(10) Patent No.: US 9,276,785 B2
(45) Date of Patent: Mar. 1, 2016

(54) WAVEFORM EQUALIZATION APPARATUS

(71) Applicant: DENSO CORPORATION, Kariya, Aichi-pref. (JP)

(72) Inventors: Nobuaki Matsudaira, Chiryu (JP); Hironobu Akita, Okazaki (JP); Shigeki Ohtsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/807,158

(22) Filed: Jul. 23, 2015

(65) Prior Publication Data

US 2016/0036606 A1 Feb. 4, 2016

(30) Foreign Application Priority Data

Jul. 31, 2014 (JP) ................. 2014-156283

(51) Int. Cl.
*H03H 7/40* (2006.01)
*H04L 27/01* (2006.01)
*H04B 1/00* (2006.01)
*H04L 7/00* (2006.01)

(52) U.S. Cl.
CPC .............. *H04L 27/01* (2013.01); *H04B 1/0003* (2013.01); *H04L 7/0012* (2013.01)

(58) Field of Classification Search
CPC ..... H04L 7/007; H04L 7/0004; H04L 7/0012; H04L 7/0062; H04L 27/01; H04B 1/0003
See application file for complete search history.

(56) References Cited

U.S. PATENT DOCUMENTS

| | | | | |
|---|---|---|---|---|
| 5,475,710 A * | 12/1995 | Ishizu | ............... | H04L 25/03057 333/18 |
| 6,693,958 B1 * | 2/2004 | Wang | .................... | H04H 40/18 348/726 |
| 2005/0058192 A1 * | 3/2005 | Lee | .......... | H04H 40/18 375/224 |
| 2005/0185742 A1 * | 8/2005 | Liu | .......... | H04L 7/007 375/348 |
| 2007/0092260 A1 * | 4/2007 | Bontu | ................... | H04J 3/0608 398/152 |
| 2007/0201544 A1 * | 8/2007 | Zhu | .................. | H04L 25/03057 375/229 |
| 2011/0246809 A1 * | 10/2011 | Dewhirst | .................. | G06F 1/12 713/401 |
| 2012/0134684 A1 * | 5/2012 | Koizumi | .............. | H04B 10/613 398/202 |
| 2013/0207706 A1 | 8/2013 | Yanagisawa | | |

OTHER PUBLICATIONS

Harwood et al. "A 12.5Gb/s SerDes in 65nm CMOS Using a Baud-Rate ADS with Digital Receiver Equalization and Clock Recovery", ISSCC Dig. Tech. Papers, pp. 436-591, Fig 24.1.1, 2007 (discussed on p. 1 of specification).

* cited by examiner

*Primary Examiner* — Syed Haider
(74) *Attorney, Agent, or Firm* — Posz Law Group, PLC

(57) ABSTRACT

A waveform equalization apparatus includes an A/D converter, a waveform equalizer, a training sequence generator, a clock recovery circuit, multiple matched filters, and a clock optimization logic. The A/D converter oversamples a reception signal in synchronization with a base clock signal and generates an A/D converted data sequence. The waveform equalizer performs an arithmetic operation to equalize a waveform. The training sequence generator generates a data sequence for training. The data sequence for training is used instead of an output data of the detector so as to converge a coefficient used in the arithmetic operation in advance. The clock recovery circuit supplies the base clock signal without executing a clock recovery operation during a training period, and executes the clock recovery operation according to the output data of the detector. The matched filters receive the A/D converted data sequence, and execute a filter arithmetic operation.

6 Claims, 15 Drawing Sheets

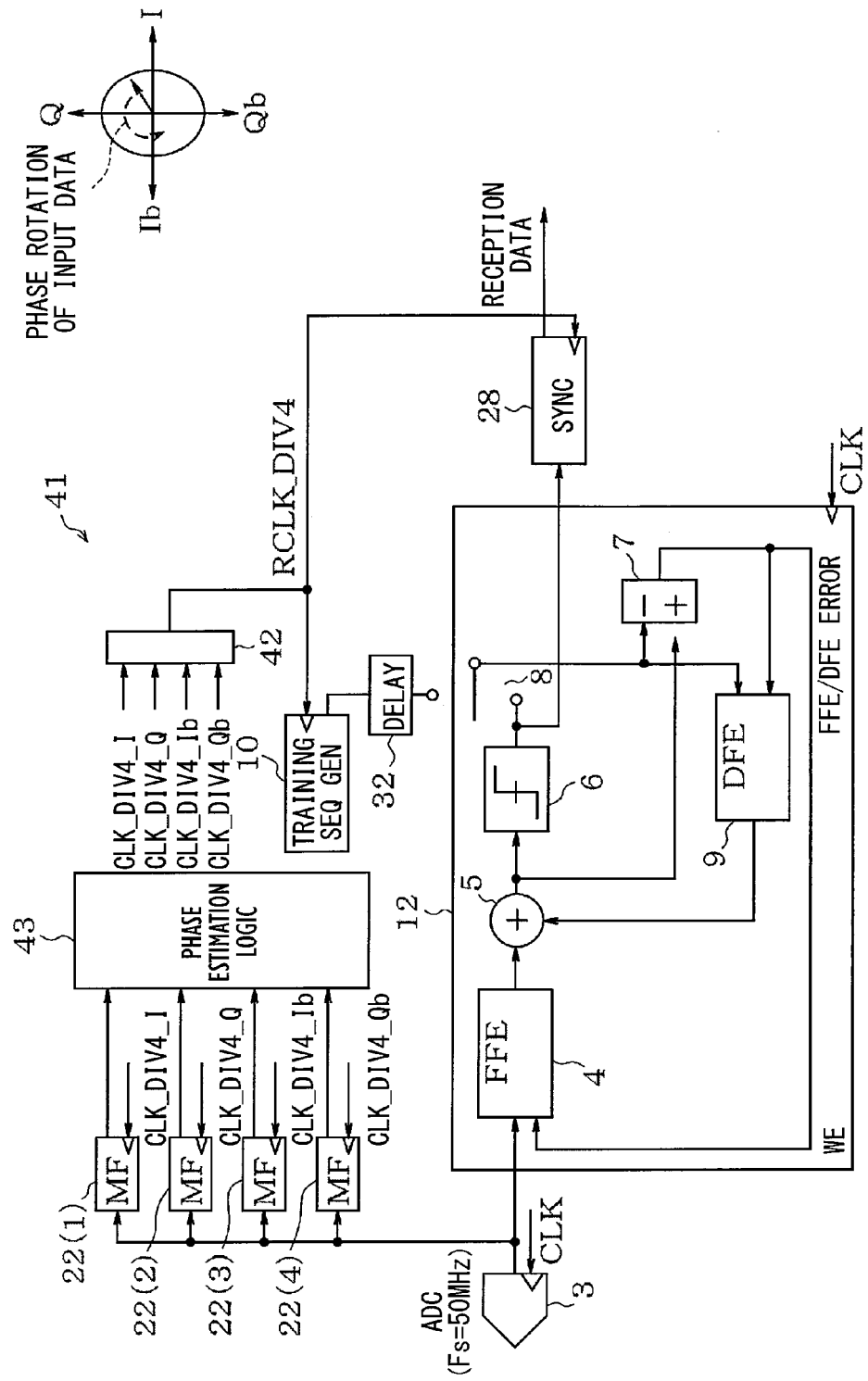

FIG. 10B
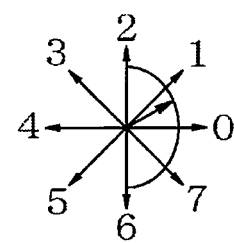
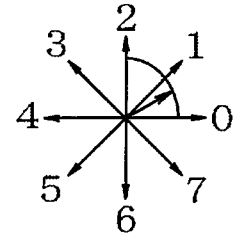
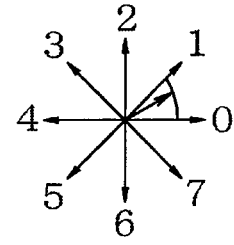

COMPARISON EXAMPLE

COMPARISON EXAMPLE

COMPARISON EXAMPLE

COMPARISON EXAMPLE

COMPARISON EXAMPLE

WAVEFORM EQUALIZATION APPARATUS

CROSS REFERENCE TO RELATED APPLICATION

This application is based on Japanese Patent Application No. 2014-156283 filed on Jul. 31, 2014, the disclosure of which is incorporated herein by reference.

TECHNICAL FIELD

The present disclosure relates to a waveform equalization apparatus that includes a waveform equalizer performing an arithmetic operation so as to perform waveform equalization of a A/D converted data series.

BACKGROUND ART

Non-patent literature 1: "A 12.5 Gb/s SerDes in 65 nm CMOS Using a Baud-Rate ADC with Digital Receiver Equalization and Clock Recovery", ISSCC Dig. Tech. Papers, pp. 436-591, FIG. 24.1.1, 2007.

Non-patent literature 1 discloses an example of a configuration in which an A/D converter performs an A/D conversion to a reception signal, and a waveform equalizer having a feed-forward equalizer (hereinafter, referred to as FFE) and a decision feedback equalizer (hereinafter, referred to as DFE) compensates an attenuation due to an inter symbol interference (hereinafter, referred to as ISI) in a transmission line.

When the waveform equalizer processes a reception data, the waveform equalizer operates so that tap coefficients of the FFE and the DFE are converged to an optimum value removing the ISI (also referred to as an adaptive equalization). However, when the waveform equalizer is used in a transmission line in which a reception signal is largely distorted due to the ISI, an influence of reflection, or the like, the tap coefficient may not be converged to the optimum value. This case may happen since an initial value of a tap coefficient is greatly different from an ideal value to which the tap coefficient should finally be converged and many errors may occur in a determination result of a detector (a slicer) disposed to an output stage.

SUMMARY OF THE INVENTION

It is an object of the present disclosure to provide a waveform equalization apparatus that includes a training sequence generator and a clock recovery circuit. The waveform equalization apparatus surely converges an operation.

According to one aspect of the present disclosure, a waveform equalization apparatus is provided. The waveform equalization apparatus includes an A/D converter, a waveform equalizer, a training sequence generator, a clock recovery circuit, a plurality of matched filters, and a clock optimization logic. The A/D converter oversamples a reception signal in synchronization with a base clock signal and generates an A/D converted data sequence. The waveform equalizer performs an arithmetic operation to equalize a waveform regarding the A/D converted data sequence in synchronization with the base clock signal. The waveform equalizer includes a detector at an output stage. The training sequence generator generates a data sequence for training. The data sequence for training is used so as to converge a coefficient used in the arithmetic operation in advance, instead of an output data of the detector, and the training sequence generator is used in a training period. The clock recovery circuit supplies the base clock signal without executing a clock recovery operation during the training period, and after termination of the training period, executes the clock recovery operation according to the output data of the detector and generates and outputs the base clock signal. The plurality of matched filters receive the A/D converted data sequence, and execute a filter arithmetic operation to correlate the data sequence for training with the A/D converted data sequence in synchronization with a multiphase clock signal having a frequency that corresponds to speed of the reception signal. The clock optimization logic supplies the training sequence generator with a predetermined optimum operation clock signal based on the multiphase clock signal and output data of the plurality of the matched filters.

According to the waveform equalization apparatus, during the training period, multiple matched filters correlates an operation clock signal with a data sequence for training and an operation clock signal of which a phase is optimized by the clock optimization logic is supplied to the training sequence generator. Since the training is executed separately from an operation of the clock recovery circuit, it may be possible to prevent both negative feedback operations from interfering with each other. Thus, it may be possible to quickly converge the tap coefficients of the waveform equalizer during the training period.

BRIEF DESCRIPTION OF THE DRAWINGS

The above and other objects, features and advantages of the present disclosure will become more apparent from the following detailed description made with reference to the accompanying drawings. In the drawings:

FIG. 9A is a block diagram illustrating a configuration of a waveform equalization apparatus in a third embodiment;

FIG. 9B is a diagram explaining a rotation of a phase of an input data;

FIG. 10B is a diagram illustrating a virtual plane coordinate;

DETAILED DESCRIPTION

A method that assists a convergence of a tap coefficient by giving a predetermined training pattern to a waveform equalizer is known. At the time of training, a training sequence generator generates an error signal without using a determination output of a determination device. Accordingly, since an influence of a determination error of the determination device is removed, the tap coefficient converges properly.

Figure 13:
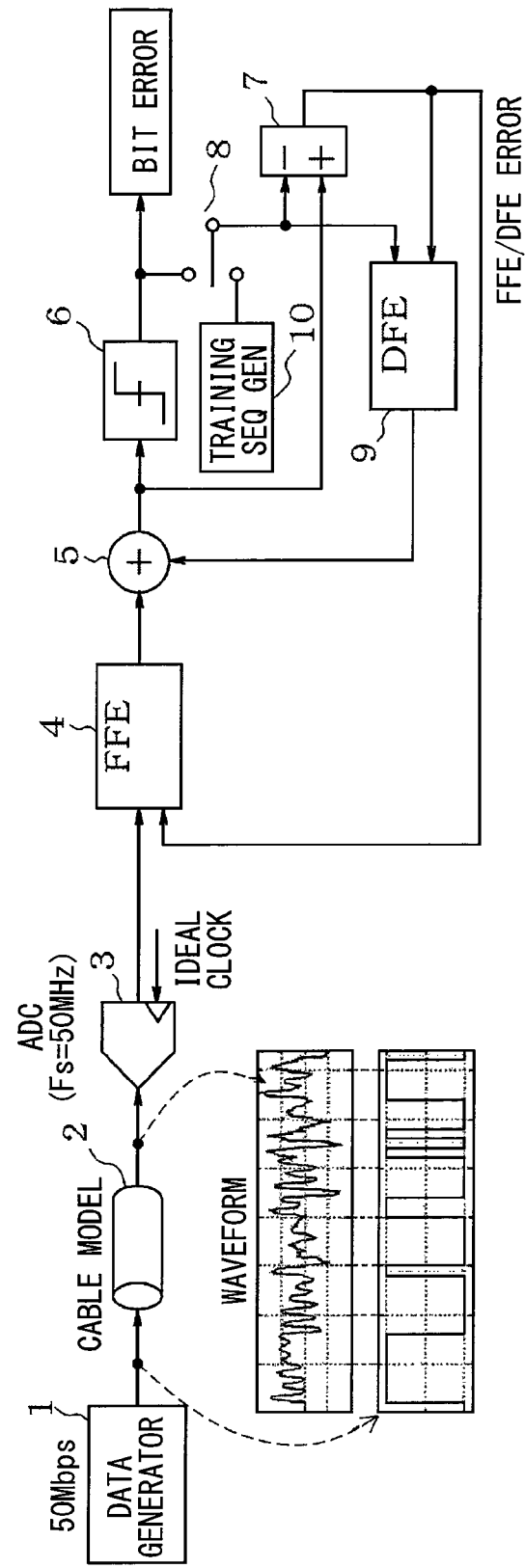
FIG. 13 is a block diagram illustrating a configuration of a waveform equalization apparatus in a comparison example.

As described in FIG. 13, a data generator 1 generates a signal of 50 Mbps. The signal is transmitted through a cable model 2 that simulates a transmission line. An analog-to-digital (A/D) converter 3 receives the signal. FIG. 13 shows a status where a waveform of a signal transmitted through the cable model 2 is distorted. The A/D converter 3 samples the reception signal with an ideal clock signal of a frequency of 50 MHz. An output data of the A/D converter 3 is input to a detector 6 through a FFE 4 and an adder 5.

A subtraction-target input terminal of a subtractor 7 is connected with an output terminal of the adder 5. A subtraction input terminal of the subtractor 7 is connected with a movable contact of a switch 8 and an input terminal of a DFE 9. One of fixed contacts of the switch 8 is connected to an output terminal of the detector 6. The other of the fixed contacts of the switch 8 is connected to an output terminal of a training sequence generator 10. An output data (written as FFE/DFE error in FIG. 13) of the subtractor 7 is given to another input terminal of the FFE 4 and another input terminal of the DFE 9. The adder 5 receives the output data of the DFE 9.

Figure 14A:
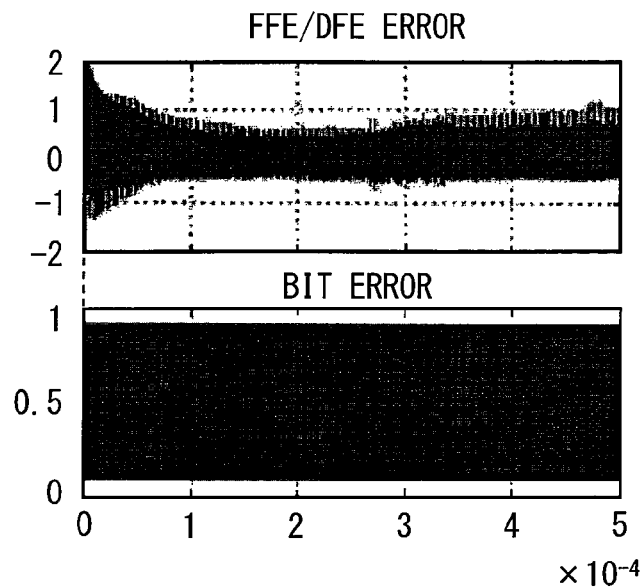
FIG. 14A is a diagram illustrating a simulation result when a detector is in an effective status.
Figure 14B:
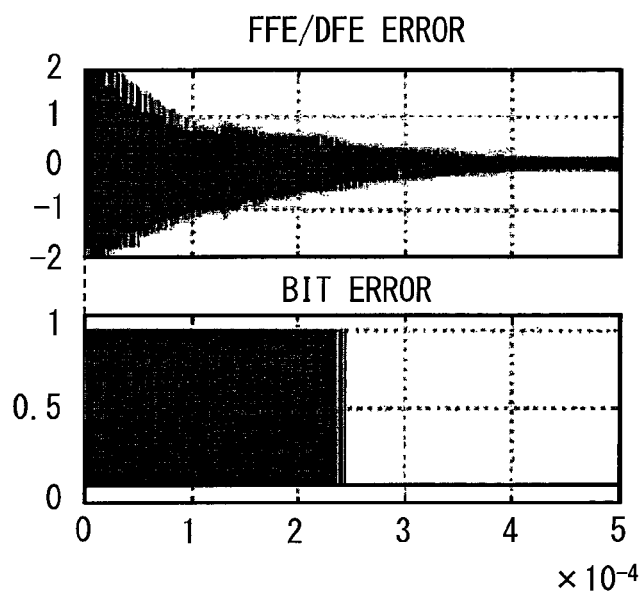
FIG. 14B is a diagram illustrating a simulation result when a training sequence generator is in an effective status.

As described in FIG. 13, since a waveform distortion of the reception signal transmitted through the cable model 2 is large, the output (the FFE/DFE error) of the subtractor 7 is not converged at all when the switch 8 is turned to a side of the detector 6 (referring to FIG. 14A). A bit error (corresponding to a dissidence with a data pattern output from the data generator 1) in a determination output of the detector 6 shows "1" (indicating a dissidence status) at all times. As described in FIG. 14B, when the switch 8 is turned to a side of the training sequence generator 10, the FFE/DFE error converges and the Bit error becomes zero finally.

Figure 15:
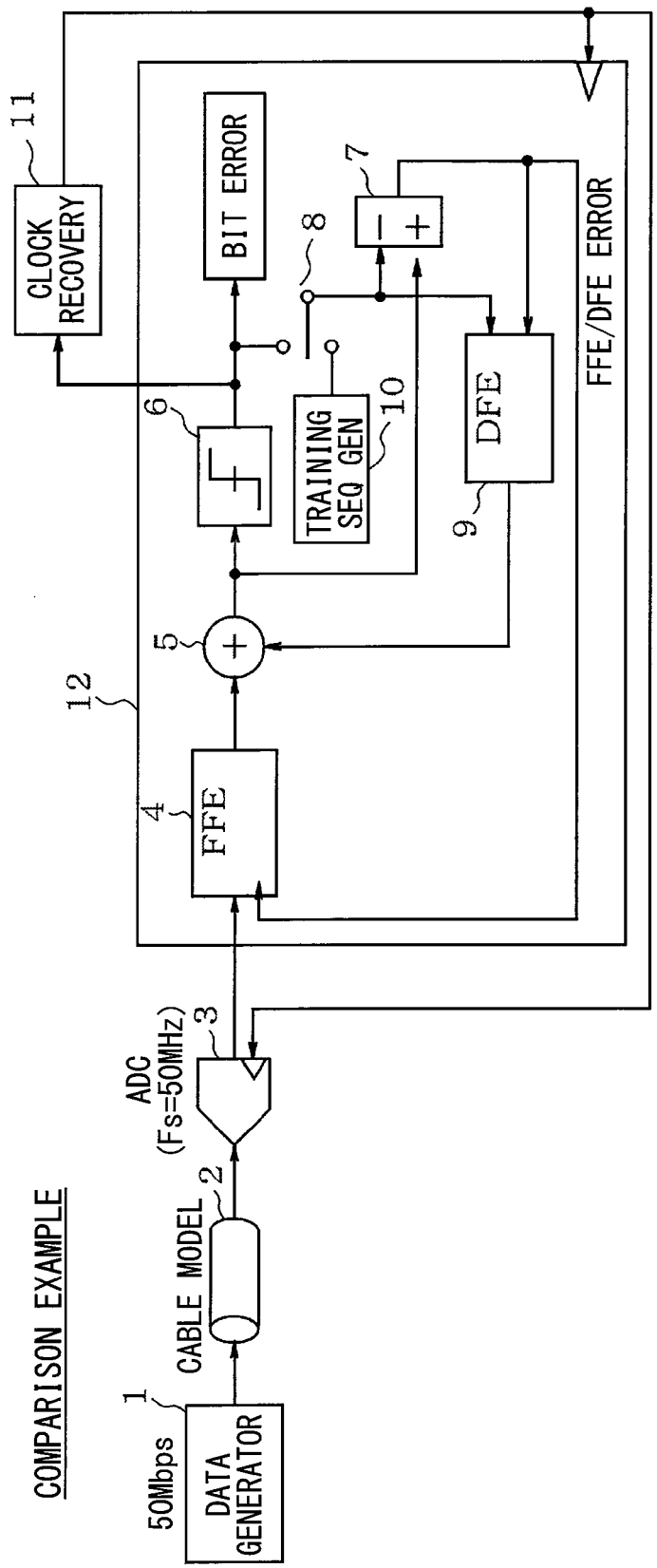
FIG. 15 is a block diagram illustrating a configuration of the waveform equalization apparatus when a clock recovery circuit is used.

When a waveform equalizer is used in an actual communication, a clock error of an oscillator occurs between a transmission side and a reception side. Therefore, as described in FIG. 15, a clock recovery circuit 11 may be connected to the output terminal of the detector 6. The clock recovery circuit 11 outputs a clock signal. The clock signal may be used as an operation clock of the A/D converter 3 and the waveform equalizer 12.

Figure 16:
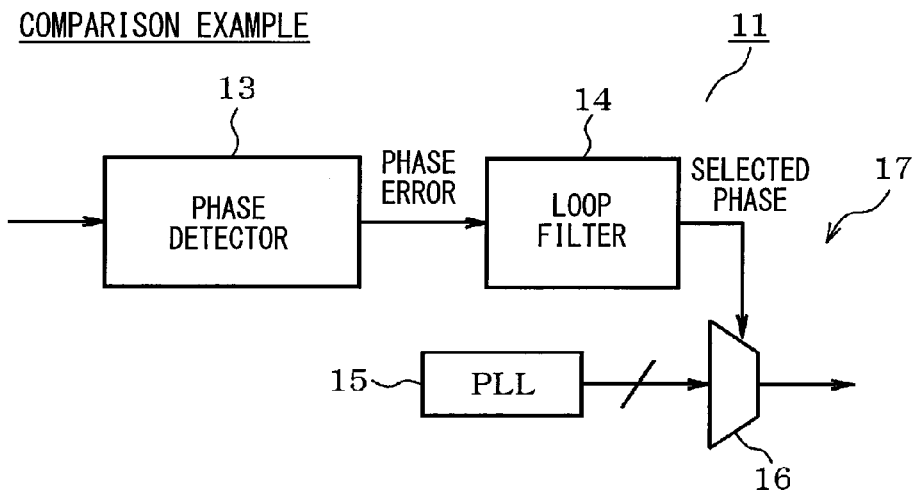
FIG. 16 is a block diagram illustrating a detailed configuration of the clock recovery circuit.

As described in FIG. 16, the clock recovery circuit 11 includes a clock phase selection portion 17 that has a phase detector 13, a loop filter 14, a PLL 15, and a selector 16. An output (corresponding to a phase error) of the phase detector 13 is equal to a value proportional to a phase difference between a phase of a reception data that is output by the detector 6 and a local clock signal that is used in a waveform equalizer 12. The local clock signal used in the waveform equalizer 12 corresponds to a clock signal that is output from the clock recovery circuit 11. The clock recovery circuit 11 is a negative feedback circuit so that the above phase difference becomes equal to zero.

Figure 17:
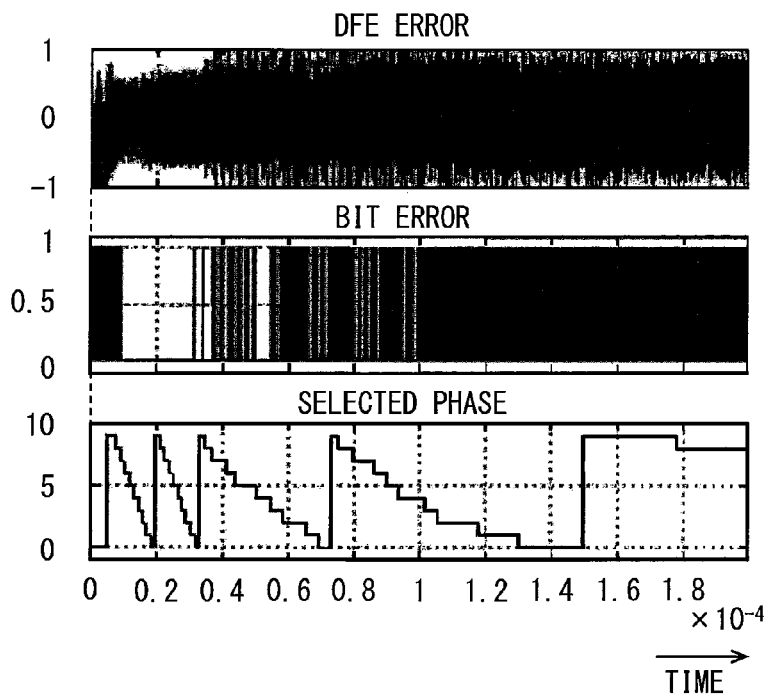
FIG. 17 is a diagram illustrating a simulation result.

In addition, the FFE 4 and the DFE 9 also a negative feedback circuit, so that the FFE/DFE error that is a difference between an input and an output of the detector 6 is minimized. Thus, a circuit illustrated in FIG. 15 includes two negative feedback circuits that minimize two kinds of error amounts. The two negative feedbacks may interfere with each other and an operation may be intrinsically unstable. When a transmission line having large distortion is used, a phase fluctuation of the clock signal in the clock recovery circuit 11 may strongly effect on a convergence operation of the tap coefficient by the FFE 4 and the DFE 9, and therefore, an operation may become extremely unstable. Therefore, a simulation result illustrated in FIG. 17 shows that each error is not converged.

First Embodiment

A first embodiment will be explained. Incidentally, a portion identical to a portion in FIG. 15 will be given the identical symbol, and an explanation of the identical portion will be omitted. A portion different from a portion illustrated in FIG. 15 will be explained basically. A waveform equalization apparatus 21 in the present embodiment has four matched filters (MF) 22(1)-22(4). As described in FIG. 1, the four matched filters (MF) 22(1)-22(4) receive an output data of an A/D converter 3. A phase estimation logic 23 receives an output data of the matched filters 22(1)-22(4). The phase estimation logic 23 may correspond to an example of a clock optimization logic.

Figure 2:
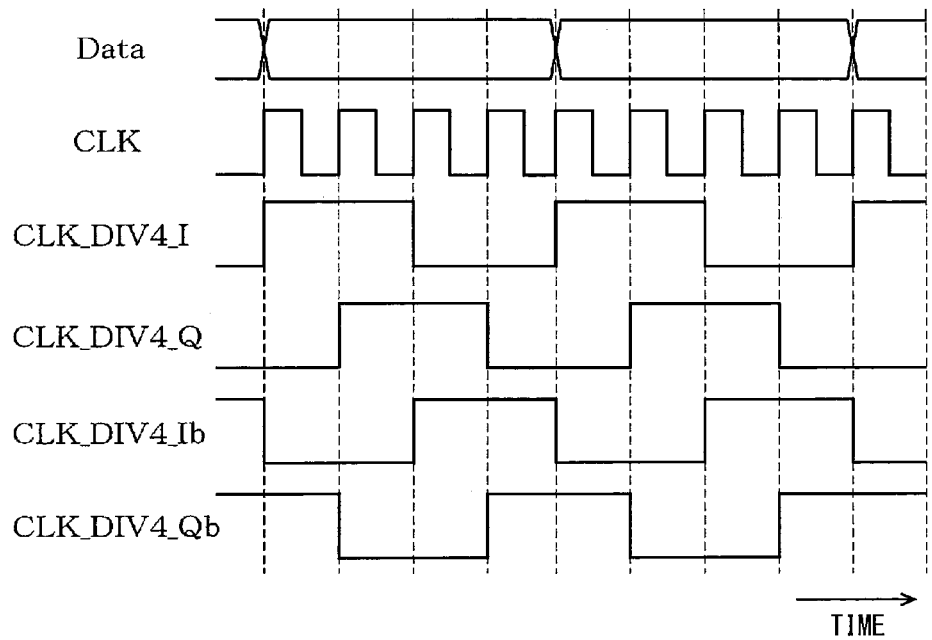
FIG. 2 is a diagram illustrating a phase relation between a reception data and each clock signal.

The A/D converter 3 and the waveform equalizer 12 receive a base clock signal CLK. The base clock signal CLK is a clock of four times frequency to a reception data rate as described in FIG. 2. Therefore, the A/D converter 3 four-times oversamples an analog reception signal. Incidentally, the clock recovery circuit 11 does not perform a clock recovery operation (a negative feedback control) during the training period and simply outputs a clock signal (corresponding to either one of the four-phase clock signal) generated inside as a base clock signal CLK.

Figure 3:
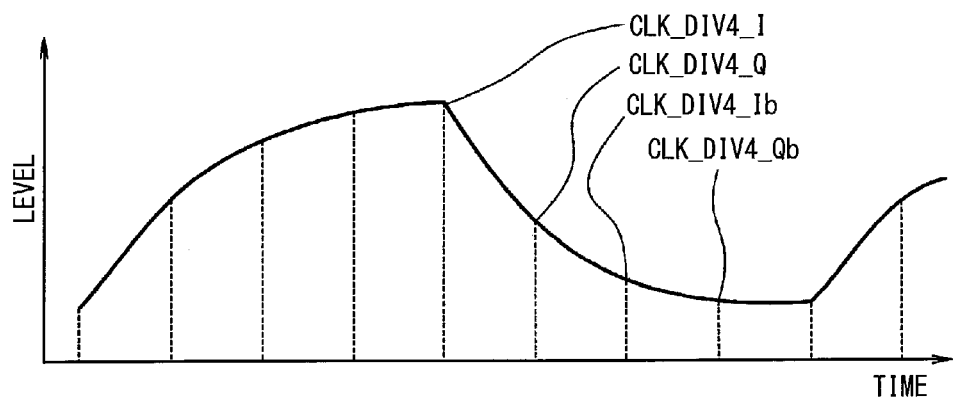
FIG. 3 is a diagram illustrating a phase relation between a reception signal waveform and a four-phase clock signal.

The matched filter 22(1) receives a clock signal CLK_DIV4_I as the operation clock. The matched filter 22(2) receives a clock signal CLK_DIV4_Q as the operation clock. The matched filter 22(3) receives a clock signal CLK_DIV4_Ib as the operation clock. The matched filter 22(4) receives a clock signal CLK_DIV4_Qb as the operation clock. The four clock signals CLK_DIV4_I, CLK_DIV4_Q, CLK_DIV4_Ib_CLK_DIV4_Qb are different from each other. The four clock signals CLK_DIV4_I, CLK_DIV4_Q, CLK_DIV4_Ib_CLK_DIV4_Qb are a clock having a frequency of reception data rates that are obtained by quarter division of the base clock signal CLK (referring to FIG. 3). A phase difference of the four clock signals CLK_DIV4_I, CLK_DIV4_Q, CLK_DIV4_Ib_CLK_DIV4_Qb is equal to 90 degree. The four clock signals CLK_DIV4_I, CLK_DIV4_Q, CLK_DIV4_Ib_CLK_DIV4_Qb is a four-phase clock signal.

Figure 4:
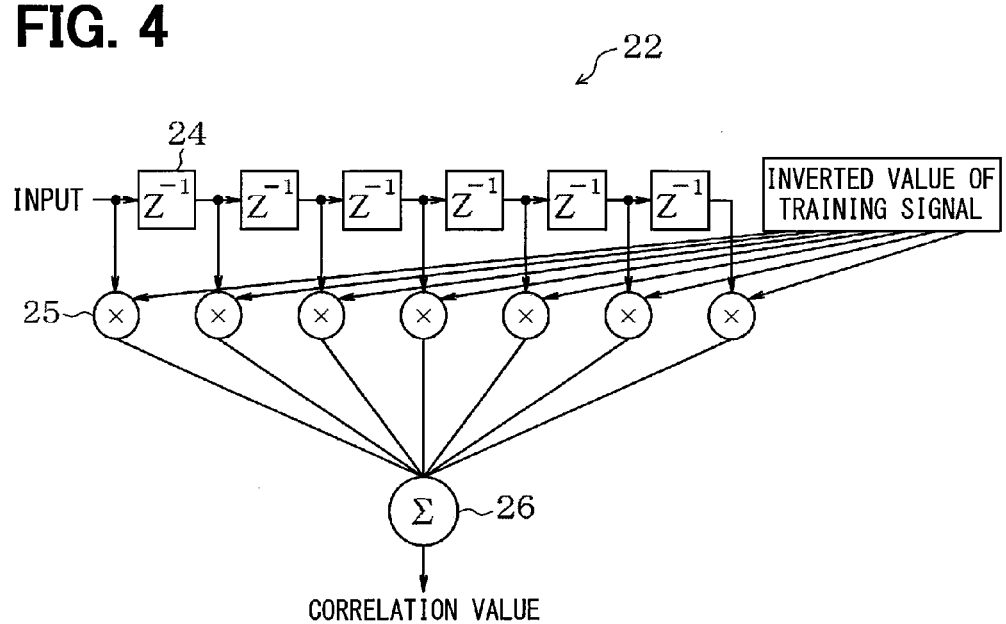
FIG. 4 is a diagram illustrating a configuration of a matched filter.

As described in FIG. 4, the matched filter 22 includes a finite impulse response (FIR) filter, and includes multiple delay devices 24, multiple multipliers 25, and an adder 26. A coefficient given to each of the multipliers 25 is a pattern obtained by inverting time series of the training pattern output from the training sequence generator 10. The training pattern may have a periodicity, and may be random number within a period. Therefore, the training pattern may be a pseudo random bit system (PRBS), for example. Incidentally, the training pattern may correspond to an example of a data sequence for training.

Figure 5A:
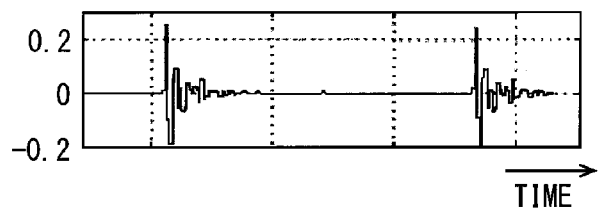
FIG. 5A is a diagram illustrating an example of a data waveform output by the matched filter.
Figure 5B:
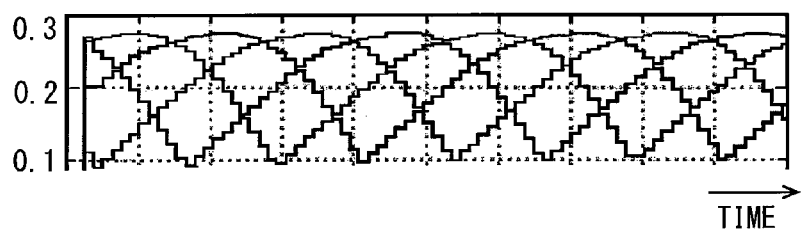
FIG. 5B is a diagram illustrating an example of a data waveform output by four matched filters when there is a frequency error.

As described in FIG. 5A, the matched filter 22 outputs a correlation value having a large peak in each period of the training pattern. A peak value of the large peak becomes maximal when a phase of the input data and a phase of the clock signal are matched. When there is a frequency error between the input data and the clock signal, a matched filter that has a maximum peak value is changed among the matched filters 22(1)-22(4). Each of the peak value of the large peak in FIG. 5A is plotted to obtained FIG. 5B. FIG. 5B shows the frequency error. Each of the output values of the four matched filters 22(1)-22(4) has a peak serially.

Figure 1:
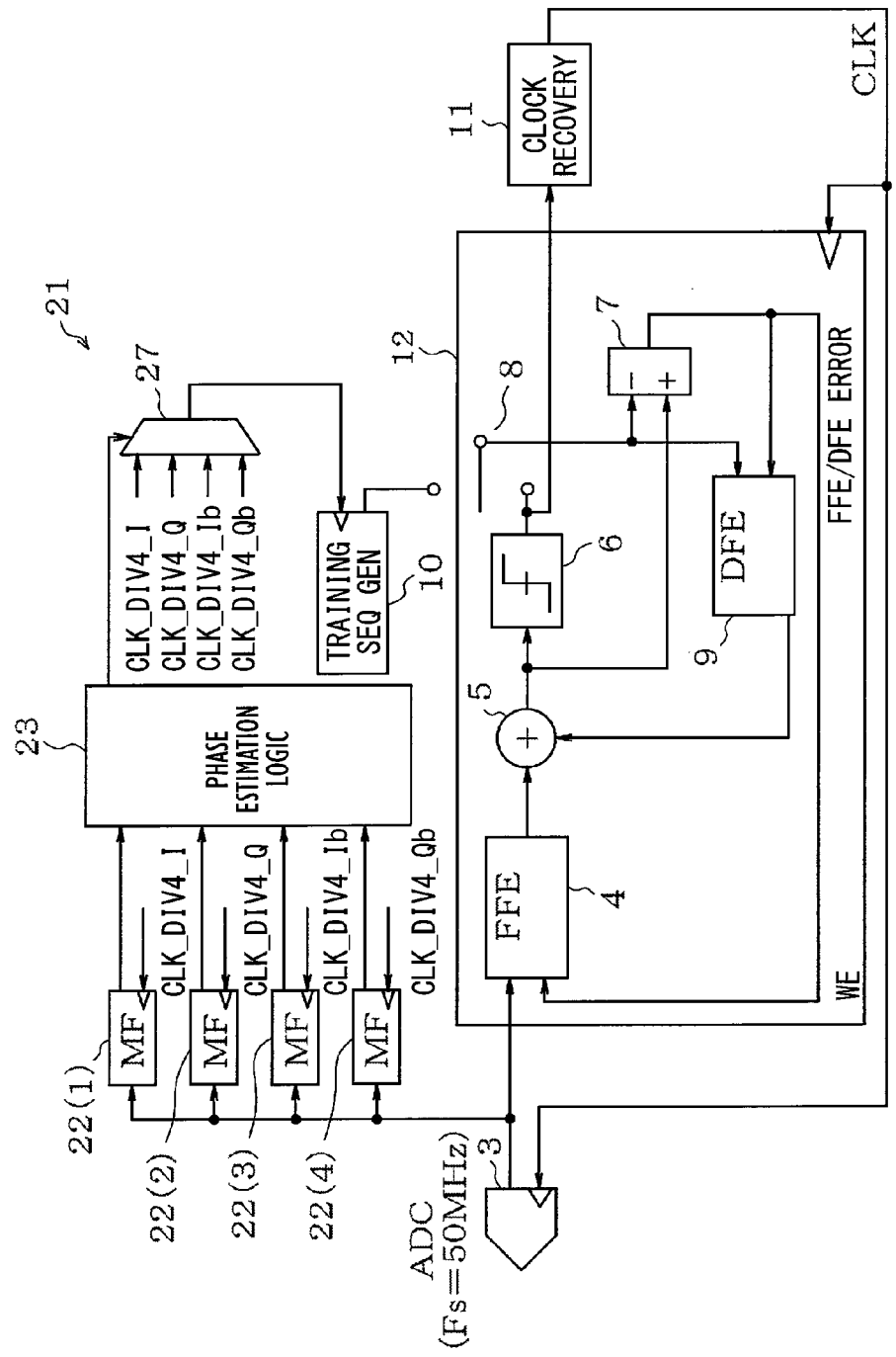
FIG. 1 is a block diagram illustrating a configuration of a waveform equalization apparatus in a first embodiment.

As described in FIG. 1, a selector 27 receives the four phase clock signals. The selector 27 may correspond to an example of the clock optimization logic. The phase estimation logic 23 outputs a selection control signal Selected_Phase to the selector 27, so that the clock signal CLK_DIV4 corresponding to a matched filter having a maximum output value (corresponding to the greatest output value) is selected among the matched filters 22(1)-22(4). The clock signal RCLK_DIV4 output through the selector 27 is supplied to the training sequence generator 10 as the operation clock.

Figure 6:
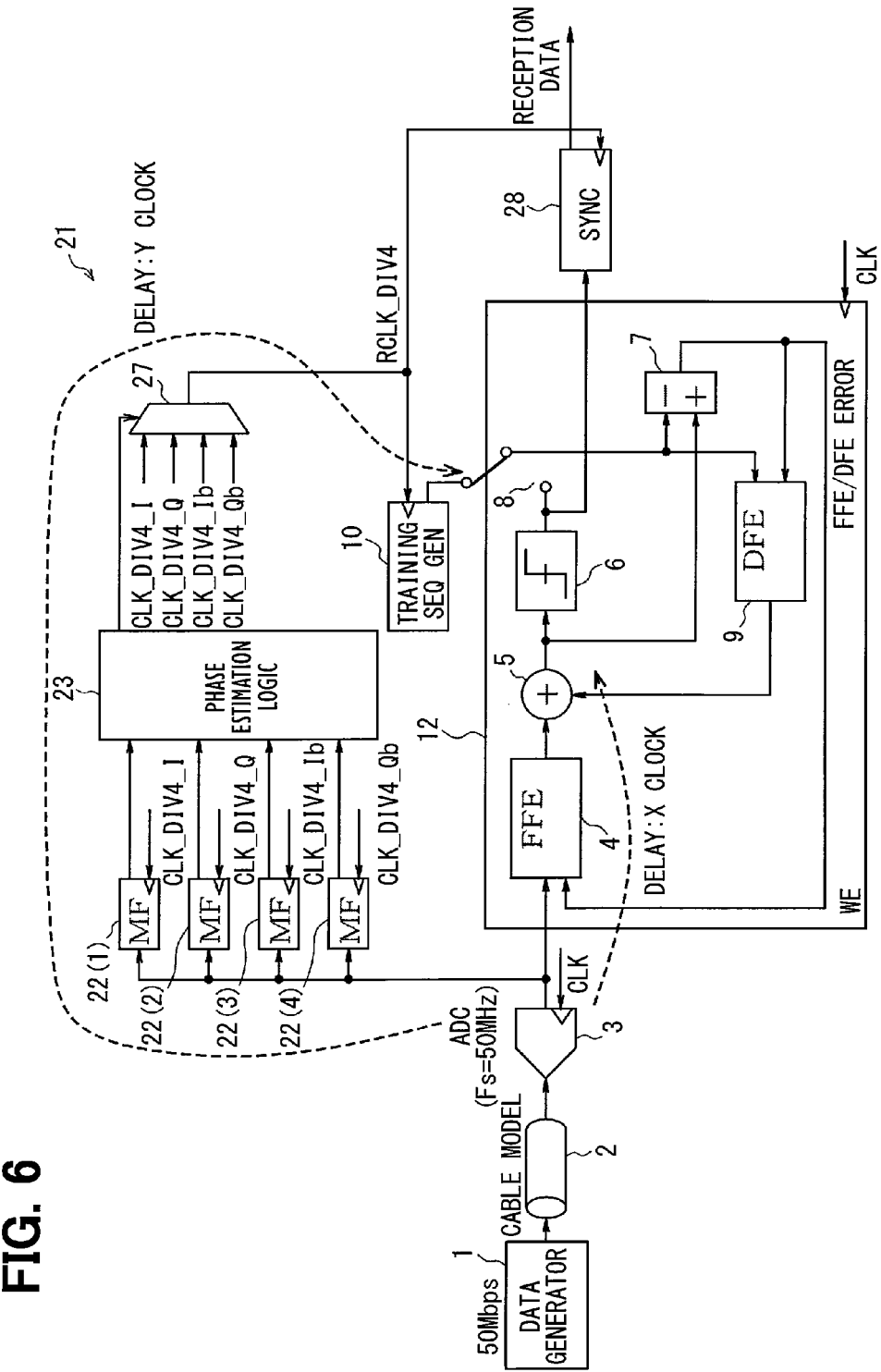
FIG. 6 is a diagram illustrating a waveform equalization apparatus when a training is performed.

FIG. 6 illustrates a configuration at the time the waveform equalization apparatus 21 performs a training. Incidentally, an illustration of the clock recovery circuit 11 is omitted. A synchronous circuit 28 is a D flip flop that synchronizes and outputs the output data of the detector 6 with the clock signal RCLK_DIV4 so as to monitor a status of the training. As described in FIG. 6, an adjustment may be performed as necessary so that a delay time Xclock corresponding to a time from the A/D converter 3 to an output of the adder 5 is equal to a delay time Yclock corresponding to a time from the A/D converter 3 to the output of the training sequence generator 10 performed by the clock signal RCLK_DIV4.

The training is performed by switching the switch 8 to a side of the training sequence generator 10. The A/D converter 3 and the waveform equalizer 12 operate based on the base clock signal CLK. The training sequence generator 10 operates based on the clock signal RCLK_DIV4. The matched filter 22 outputs to the phase estimation logic 23, a correlation value between the reception data input through the A/D converter 3 and a training pattern equal to a pattern of the reception data.

The phase estimation logic 23 causes the selector 27 to select a clock signal CLK_DIV4 corresponding to a maximum output value among the four matched filters 22(1)-22(4). The selected clock signal RCLK_DIV4 is set as an operation clock of the training sequence generator 10.

Figure 7:
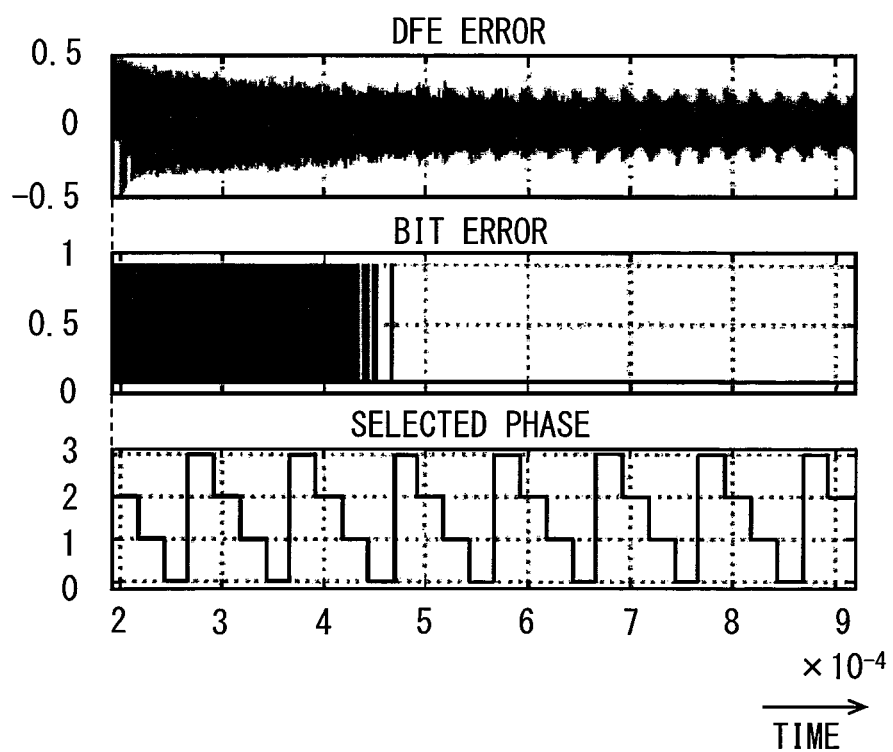
FIG. 7 is a diagram illustrating a simulation result.

Then, as described in FIG. 7, when the amount of the FFE/DFE error is reduced to a certain extent, the bit error becomes equal to zero and the tap coefficient is converged. A pattern in which the selection control signal Selected_Phase, which is output from the phase estimation logic 23, is varied is not changed after and before the convergence. With respect to a completion determination of the training period, various manners may be used. For example, in order to determine a completion of the training, a received total number of times of the training pattern may be counted, an existence of the bit error may be checked, and it may be determined whether the tap coefficient may be converged sufficiently by monitoring the amount of the FFE/DFE error.

Incidentally, the phase estimation logic 23 may learn a phase fluctuation rate (corresponding to a frequency error amount) from the output of the matched filters 22(1)-22(4) during the training. It may be possible that the phase estimation logic 23 recognizes at what speed the clock signal CLK_DIV4 is changed. Therefore, when a change of the phase is kept according to the above speed after the completion of the training period, it may be possible to generate and output the clock signal RCLK_DIV4 so as to follow the phase fluctuation of the reception data in an actual communication. However, in this case, when a frequency error in the actual communication is different from the frequency error in the training period due to temperature change or the like, it may be unable to respond sufficiently. In the present embodiment, after completion of the training period, the switch 8 is switched so that the clock recovery circuit 11 is used.

When the training period is completed, the switch 8 is changed to a side of the output of the detector 6, so that the clock recovery circuit 11 starts the clock recovery operation. Incidentally, after starting the clock recovery operation, the waveform equalization apparatus 21 receives an unknown data pattern in the actual communication. Since the waveform equalization apparatus 21 starts the waveform equalization operation from a status where the tap coefficient has already converged, it may be possible to operate without generating the bit error from the beginning.

According to the present embodiment, the A/D converter 3 oversamples the reception signal in synchronization with the base clock signal CLK. The waveform equalizer 12 performs an arithmetic operation for a waveform equalization of an A/D converted data sequence in synchronization with the base clock signal CLK. The clock recovery circuit 11 supplies the base clock signal CLK without performing the clock recovery operation during the training period. After the training period, the clock recovery circuit 11 receives the output data of the detector 6 and performs the clock recovery operation so at to generate and output the base clock signal CLK.

The matched filters 22(1)-22(4) receive the A/D converted data, and perform a filter arithmetic operation so as to correlate with the training pattern in synchronization with the four-phase clock signal CLK_DIV4 of frequency corresponding to a speed of the reception signal. In another words, the matched filters 22(1)-22(4) performs the filter arithmetic operation so that the A/D converted data and the training pattern are correlated with each other in synchronization with the four-phase clock signal CLK_DIV4. The phase estimation logic 23 supplies the training sequence generator 10 with the optimum operation clock signal RCLK_DIV4, based on the output data of the matched filter 22 and the four phase clock signals CLK_DIV4. Therefore, even when both of the training sequence generator 10 and the clock recovery circuit 11 are used, the negative feedback operations in both of the training sequence generator 10 and the clock recovery circuit 11 are not interfered with each other during the training period. It may be possible to quickly converge the tap coefficient in the waveform equalizer 12.

The optimum operation clock signal corresponds to a predetermined optimum operation clock signal.

The phase estimation logic 23 selects a clock signal with the selector 27 as the operation clock signal of the training sequence generator 10, the selected clock signal corresponding to a matched filter 22 showing a maximum data value among the four-phase clock signal CLK_DIV4. Therefore, it may be possible to optimize the operation clock signal with a simply configured logic.

Second Embodiment

Figure 8:
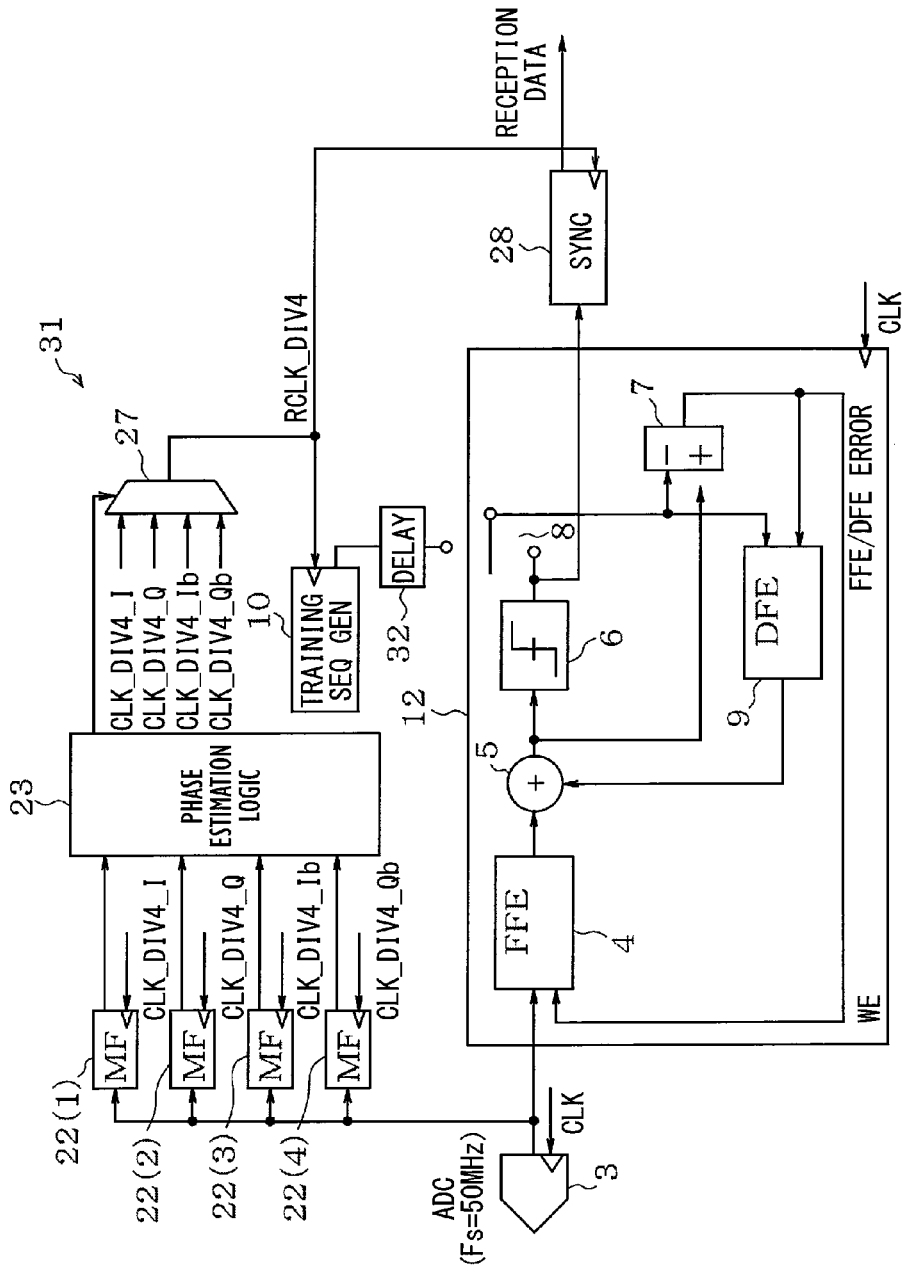
FIG. 8 is a block diagram illustrating a configuration of a waveform equalization apparatus in a second embodiment.

Followingly, a portion different from the first embodiment will be explained. As described in FIG. 8, a waveform equalization apparatus 31 in the second embodiment adjusts the delay time Xclock corresponding to a time from the A/D converter 3 to the output of the adder 5 and the delay time Yclock corresponding to a time from the A/D converter 3 to the output of the training sequence generator 10 operated by the clock signal RCLK_DIV4, and the delay time Xclock becomes equal to the delay time Yclock. The waveform equalization apparatus 31 includes a delay circuit 32 (delay) between the training sequence generator 10 and the switch 8, for example.

Third Embodiment

As described in FIG. 9A, a waveform equalization apparatus 41 includes a phase interpolator 42 (corresponding to a clock optimization logic, and a clock phase interpolator) instead of the selector 27. The phase interpolator 42 is a known configuration, and is disclosed in, for example, JP 2013-192218A (corresponding to US2013/0207706A1). Based on the outputs of the matched filters 22(1)-22(4), a phase estimation logic 43 specifies where a phase of the input data belongs to four quadrants including four axes, I, Q, Ib, and Qb as described in FIG. 9B. The phase estimation logic 43 determines which axis I, Q, Ib, Qb the phase in each quadrant is close to. Then, the phase estimation logic 43 inputs the determined data to the phase interpolator 42 as a control code. The phase interpolator 42 changes a phase of the clock signal RCLK_DIV4 as being analog according to the given control code, and input to the training sequence generator 10.

According to the third embodiment, based on the output data of the matched filter 22, the phase estimation logic 43 causes the phase interpolator 42 to generate and output the clock signal RCLK_DIV4 having a phase difference smaller than a phase difference among the four-phase clock. Therefore, it may be possible to match the phase of the reception data with the phase of the clock signal RCLK_DIV4 given during the training period more precisely.

Fourth Embodiment

Figure 10A:
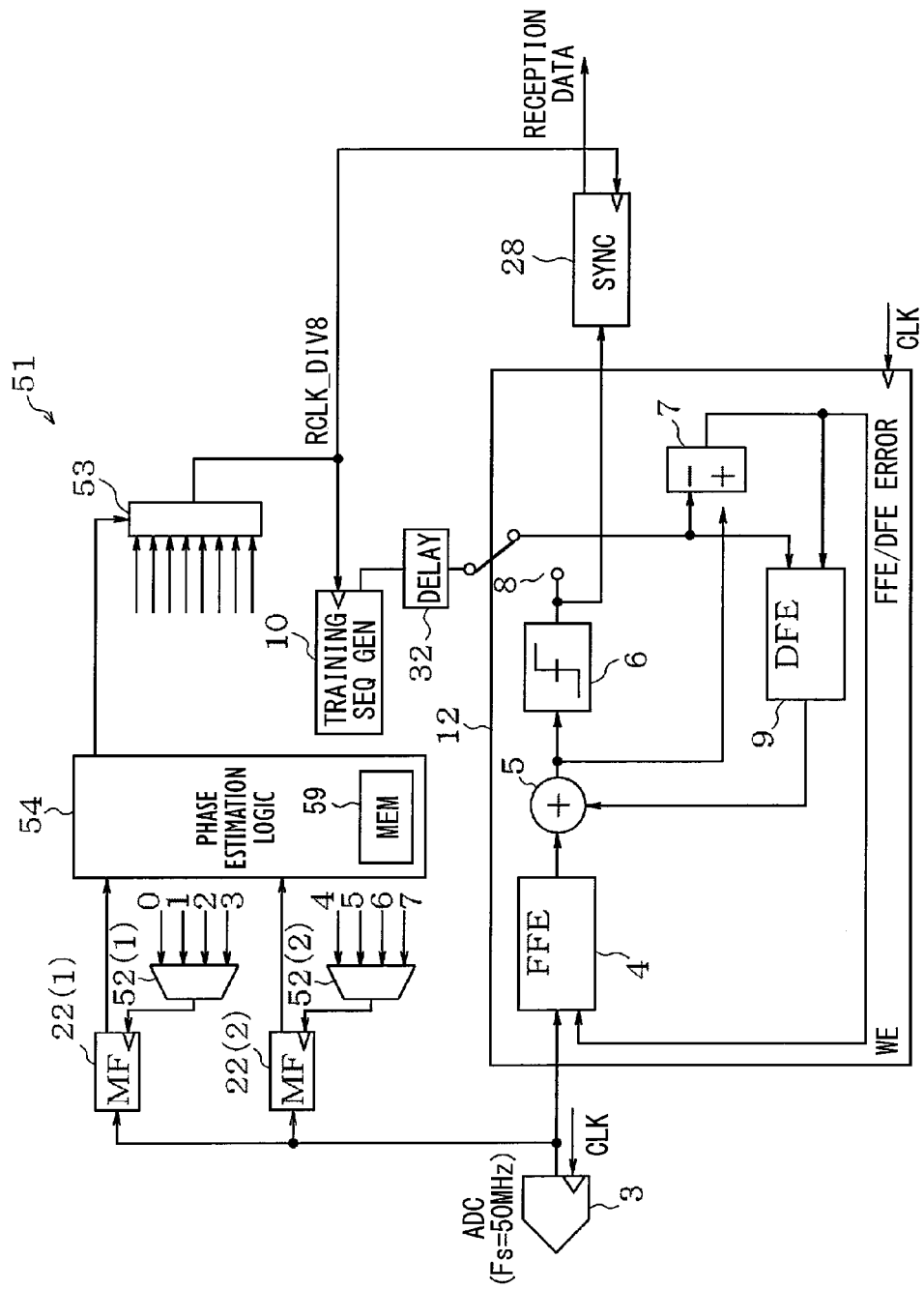
FIG. 10A is a block diagram illustrating a configuration of a waveform equalization apparatus in a fourth embodiment.
Figure 11:
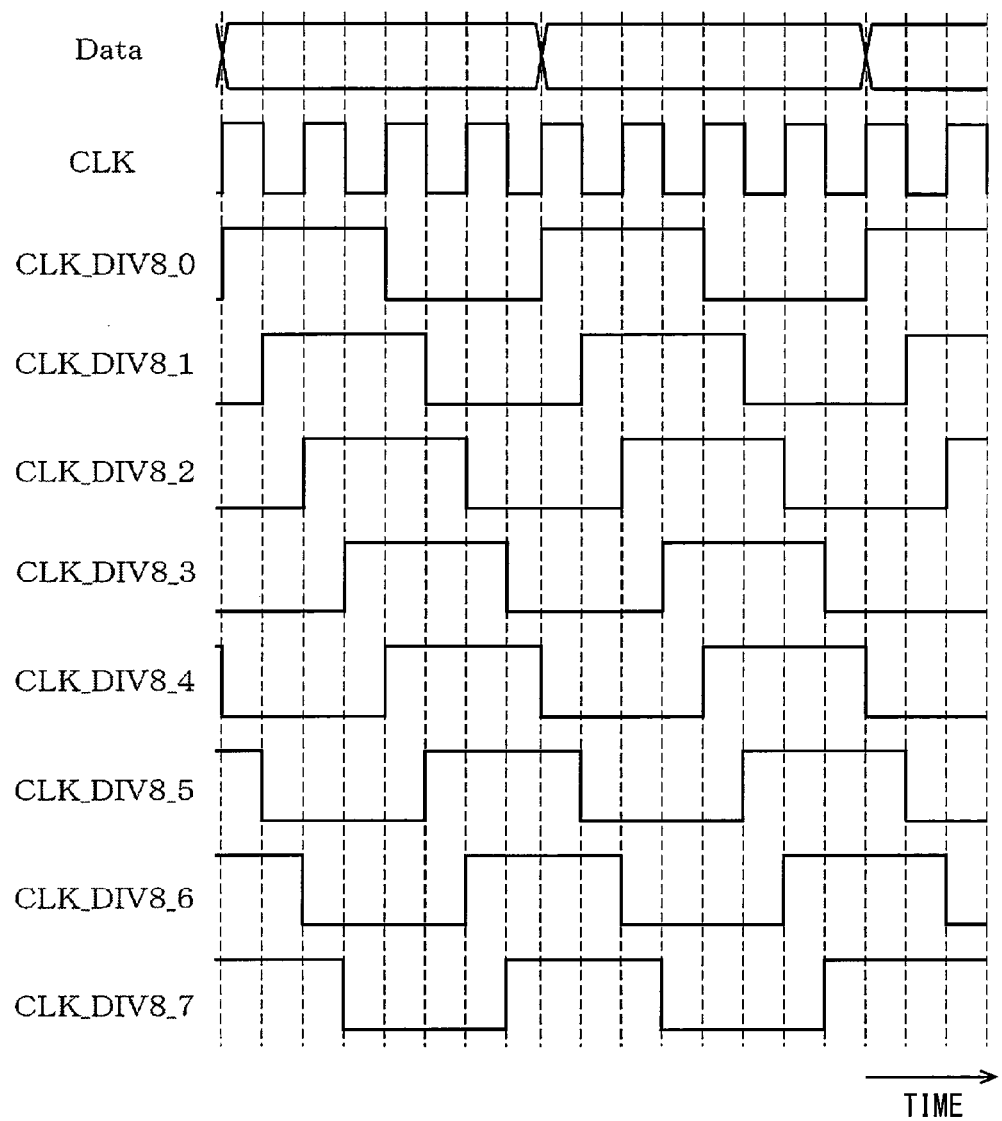
FIG. 11 is a diagram illustrating a timing chart showing an eight-phase clock signal.

A fourth embodiment will be explained. As described in FIG. 10A, a waveform equalization apparatus 51 in the fourth embodiment uses only two matched filters 22(1), 22(2). The waveform equalization apparatus 51 uses eight-phase clock signals CLK_DIV8_0~7 as described in FIG. 11. The matched filter 22(1) receives the clock signals CLK_DIV8_0~3 through a selector 52(1). The matched filter 22(2) receives the clock signals CLK_DIV8_4~7 through a selector 52(2). A selector 53 is provided instead of the selector 27 in the first embodiment. The selector 53 receives the eight-phase clock signals CLK_DIV8_0~7. The phase estimation logic 54 performs a switching control of the selector 52 and the selector 53. Incidentally, the matched filter 22(1) may correspond to an example of a first matched filter, and the matched filter 22(2) may correspond to an example of a second matched filter.

Figure 12:
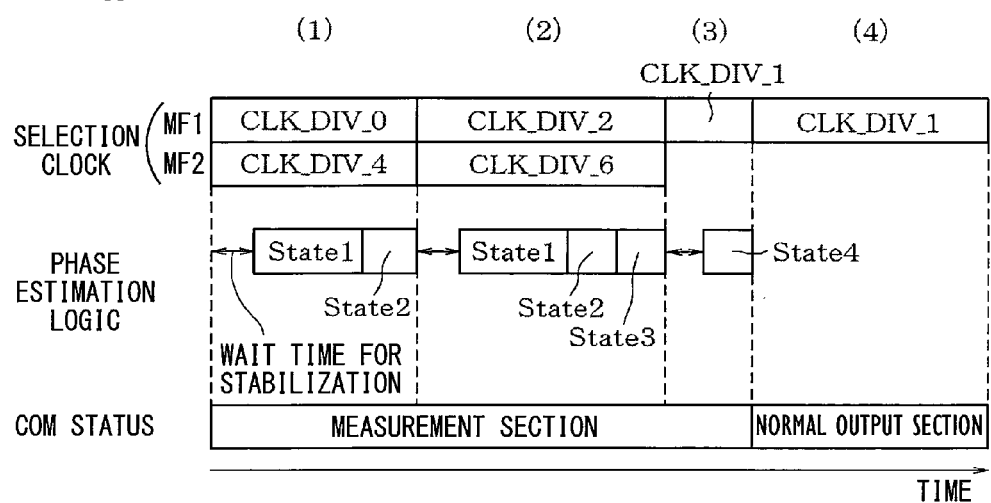
FIG. 12 is a diagram illustrating an operation time chart showing processing of a phase estimation logic.

As described in FIG. 12, in a measurement section (1), the phase estimation logic 54 causes the selectors 52(1), 52(2) to select the clock signals CLK_DIV8_0, CLK_DIV8_4 and to input the clock signals CLK_DIV8_0, CLK_DIV8_4 to the matched filters 22(1), 22(2), respectively. The phase estimation logic 54 waits until an output of the matched filter 22 becomes stable, and after the output becomes stable, the phase estimation logic 54 obtains output values of the matched filters 22(1), 22(2) at a state 1. The phase estimation logic 54 causes a memory 59 to store the output values at a state 2. The memory 59 may correspond to an example of a memory portion. Incidentally, the clock signal CLK_DIV8_0 may correspond to an example of a first clock signal, and the clock signal CLK_DIV8_4 may correspond to an example of a third clock signal.

The memory 59 may be provided to the outside of the phase estimation logic 54.

In a measurement section (2), the phase estimation logic 54 causes the selectors 52(1), 52(2) to select the clock signal CLK_DIV8_2, CLK_DIV8_6 and to input the clock signal CLK_DIV8_2, CLK_DIV8_6 to the matched filters 22(1), 22(2), respectively. The phase estimation logic 54 obtains output values of the matched filters 22(1), 22(2) at a state 1. The phase estimation logic 54 causes the memory 59 to store the output values at a state 2. Then, the phase estimation logic 54 specifies the greatest one and the second greatest one of the four values stored in the memory at a state 3.

For example, the phase estimation logic 54 specifies the greater one of the output values obtained in the measurement section (1), and then, specifies the greater one of the output values obtained in the measurement section (2).

Incidentally, the clock signal CLK_DIV8_2 may correspond to an example of a second clock signal, and the clock signal CLK_DIV8_6 may correspond to an example of a fourth clock signal.

To compare the two values obtained in the measurement section (1) corresponds to a determination which of a right half and a left half the phase of the input data belongs to in a virtual plane coordinate. The virtual plane coordinate includes eight phase vectors as described in FIG. 10B. To compare the two values obtained in the measurement section (2) corresponds to a determination which of an upper half and a lower half the phase of the input data belongs to in the virtual plane coordinate.

In a case of an example described in FIG. 10B, at the state 3 in the measurement section (2), it is determined that the eight-phase clock signal CLK_DIV8_0 is greater than the eight-phase clock signal CLK_DIV8_4 of the two values obtained at the state 2 in the measurement (1). It is determined that the eight-phase signal CLK_DIV8_2 is greater than the eight-phase signal CLK8_6 of the two values obtained at the state 2 in the measurement (2). At this point, it becomes clear that the phase of the input data belongs to an upper right quarter as described in FIG. 10B.

In the following a state 4 in a measurement section (3), the phase estimation logic 54 causes the selector 52(1) to select the eight-phase clock signal CLK_DIV8_1 and to input to the matched filter 22(1). The phase estimation logic 54 compares the obtained output value corresponding to the eight-phase clock signal CLK_DIV8_1 and the output value corresponding to the eight-phase clock signals CLK_DIV8_0, CLK_DIV8_2. Since the output value corresponding to the eight-phase clock signal CLK_DIV8_1 has a maximal value, the phase estimation logic 54 selects the eight-phase clock signal CLK_DIV8_1 in the following normal output section, and sets the eight-phase clock signal CLK_DIV8_1 as the clock signal RCLK_DIV8. Incidentally, when the phase interpolator 42 in the third embodiment is used instead of the selector 53 (incidentally, this phase interpolator compatible with eight-phase clock inputs), the clock signal RCLK_DIV8 having a phase that is closer to the eight-phase clock signal CLK_DIV8_1 of the eight-phase clock signals CLK_DIV8_0, CLK_DIV8_1 is output.

Therefore, according to the fourth embodiment, in the waveform equalization apparatus, the matched filters only include the first matched filter and the second matched filter. The multiphase clock signal includes the first clock signal, the second clock signal, the third clock signal, and the fourth clock signal. The phase difference between the first clock signal and the third clock signal provides an opposite phase pair. The phase difference between the second clock signal and the fourth clock signal provides another opposite pair. The phase difference between the first clock signal and the second clock signal is equal to 90 degrees. The phase difference between the third clock signal and the fourth clock signal is equal to 90 degrees. The first matched filter receives the first clock signal and the second clock signal. The second matched filter receives the third clock signal the fourth clock signal. The clock optimization logic (i) inputs the first clock signal to the first matched filter and the third clock signal to the second matched filter, and obtains two output values from the first matched filter and the second matched filter, (ii) inputs the second clock signal to the first matched filter and the fourth clock signal to the second matched filter, and obtains two output values from the first matched filter and the second matched filter, (iii) when the clock optimization logic specifies either one of the first matched filter and the second matched filter that outputs the greatest output value and the second greatest output value of the four output values obtained by the clock optimization logic, the clock optimization logic inputs to the specified either one of the first matched filter and the second matched filter, the different clock signal that has the phase between two clock signals corresponding to the greatest value and the second greatest value to obtain the different output value, specifies the maximum value of the obtained different output value regarding the either one of the first matched filter and the second matched filter, and supplies the training sequence generator with the predetermined optimum operation clock signal based on the maximum value.

According to the fourth embodiment, each of the matched filters 22(1), 22(2) is assigned with four phases of the eight-phase clock signals as the operation clock signal. The operation clock signals are input by switching a time division manner. The phase estimation logic 54 causes the memory 59 to store an output result of the matched filter 22. The phase estimation logic 54 processes the output data of each matched filter 22 read out from the memory. Therefore, it may be possible to reduce the number of the matched filter 22 and to minimize the waveform equalization apparatus 51.

A four-phase clock signal received by the matched filter 22(1) and a four-phase clock signal received by the matched filter 22(2) are selected so that a phase difference between the four-phase clock signal received by the matched filter 22(1) and a phase of the four-phase clock signal received by the matched filter 22(2) corresponds to an opposite phase pair. The opposite phase pair shows a relation between the four-phase clock signals CLK_DIV8_0, CLK_DIV8_4, for example. The phase estimation logic 54 initially inputs a pair of clock signals (CLK_DIV8_0, CLK_DIV8_4) being the opposite phase relation to the matched filters 22(1), 22(2), and obtains the output values. Then, the phase estimation logic 54 inputs another pair of multi-phase clock signals having a phase difference of 90 degree to the pair of the clock signals, and obtains two output values. For example, a clock signal having the phase difference of 90 degree to the four-phase clock signal CLK_DIV8_0 corresponds to the four-phase clock signal CLK_DIV8_4. A clock signal having the phase difference of 90 degree to the four-phase clock signal CLK_DIV8_4 corresponds to the four-phase clock signal CLK_DIV8_6.

When a matched filter 22 that outputs the greatest value and the second greatest value of the obtained four output values is specified, the matched filter 22 receives a clock signal CLK_DIV8_1 that has a phase between the multiple clock signals CLK_DIV8_0, CLK_DIV8_2 corresponding to the two values, and the phase estimation logic 54 obtains the output value. The phase estimation logic 54 specifies a maximum value of the output value obtained in the matched filter 22. The phase estimation logic 54 supplies the training sequence generator 10 with an optimum operation clock signal RCLK_DIV8 based on the maximum value.

The phase of the input data is specified to a region of a minimum phase difference of the eight-phase clock signal, finally. The region of the minimum phase difference of the eight-phase clock signal corresponds to a side closer to CLK_DIV8_1 than CLK_DIV8_0 in the region between CLK_DIV8_0 and CLK_DIV8_1. Therefore, when a single matched filter 22 receives two or more multi-phase clock signals by switching in a time division manner, it may be possible to quickly specify a phase of an input data.

The present disclosure is not limited to the present embodiment and the drawings, and may be modified and/or expanded as follows.

The data rate of the reception signal is not limited to 50 MHz.

A multiple of the oversampling is not limited to four, and may be determined appropriately according to individual designs. The number of phases of the multi-phase is not limited to four or eight.

The number of the matched filter is not limited to two or four.

The configuration of the four-phase clock in the first embodiment may use the clock selection system in the fourth embodiment. The configuration using the eight-phase clock in the fourth embodiment may be implemented by the configuration in the first embodiment.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A waveform equalization apparatus comprising:
an analog-to-digital (A/D) converter oversampling a reception signal in synchronization with a base clock signal to generate an A/D converted data sequence;
a waveform equalizer performing an arithmetic operation to equalize a waveform regarding the A/D converted data sequence in synchronization with the base clock signal, wherein the waveform equalizer includes a detector at an output stage;
a training sequence generator generating a data sequence for training, wherein the data sequence for training is used so as to converge a coefficient used in the arithmetic operation in advance, the data sequence for training is used instead of an output data of the detector, wherein the training sequence generator is used during a training period;
a clock recovery circuit
supplying the base clock signal without executing a clock recovery operation during the training period, and
after termination of the training period, executing the clock recovery operation according to the output data of the detector and generating and outputting the base clock signal;

a plurality of matched filters
receiving the A/D converted data sequence, and
executing a filter arithmetic operation to correlate the data sequence for training with the A/D converted data sequence in synchronization with a multiphase clock signal having a frequency that corresponds to speed of the reception signal; and
a clock optimization logic supplying the training sequence generator with a predetermined optimum operation clock signal based on the multiphase clock signal and output data of the plurality of the matched filters.

2. The waveform equalization apparatus according to claim 1, wherein:
the multiphase clock signal includes a plurality of clock signals;
the clock optimization logic selects a clock signal corresponding to a matched filter that has a greatest data value among the plurality of clock signals; and
the clock signal corresponding to the matched filter that has the greatest data value is an operation clock signal of the training sequence generator.

3. The waveform equalization apparatus according to claim 1, wherein:
the clock optimization logic includes a clock phase interpolator;
the multiphase clock signal includes a plurality of clock signals;
the clock phase interpolator generates and outputs a clock signal that has a phase difference smaller than a phase difference between two of the plurality of clock signals based on the output data of the matched filters.

4. The waveform equalization apparatus according to claim 1, wherein:
the clock optimization logic includes a memory portion storing the output data from each of the matched filters;
the multiphase clock signal includes a plurality of clock signals;
each of the matched filters enables to receive the plurality of clock signals by switching in time division as an operation clock signal; and
the clock optimization logic processes the output data of the matched filters, the output data being read out from the memory portion.

5. The waveform equalization apparatus according to claim 4, wherein:
the matched filters only include a first matched filter and a second matched filter;
the multiphase clock signal include a first clock signal, a second clock signal, a third clock signal, and a fourth clock signal;
a phase difference between the first clock signal and the third clock signal provides an opposite phase pair;
a phase difference between the second clock signal and the fourth clock signal provides another opposite pair;
a phase difference between the first clock signal and the second clock signal is equal to 90 degrees;
a phase difference between the third clock signal and the fourth clock signal is equal to 90 degrees;
the first matched filter receives the first clock signal and the second clock signal;
the second matched filter receives the third clock signal the fourth clock signal; and
the clock optimization logic
(i) inputs the first clock signal to the first matched filter and the third clock signal to the second matched filter, and obtains two output values from the first matched filter and the second matched filter;
(ii) inputs the second clock signal to the first matched filter and the fourth clock signal to the second matched filter, and obtains two output values from the first matched filter and the second matched filter;
(iii) when the clock optimization logic specifies either one of the first matched filter and the second matched filter that outputs a greatest output value and a second greatest output value of the four output values obtained by the clock optimization logic,
the clock optimization logic inputs to the specified either one of the first matched filter and the second matched filter, a different clock signal that has a phase between two clock signals corresponding to the greatest value and the second greatest value to obtain a different output value,
the clock optimization logic specifies a maximum value of the obtained different output value regarding the either one of the first matched filter and the second matched filter, and
the clock optimization logic supplies the training sequence generator with the predetermined optimum operation clock signal based on the maximum value.

6. The waveform equalization apparatus according to claim 5, wherein:
when the training sequence generator receives the predetermined optimum operation clock signal, a tap coefficient of the waveform equalizer is converged.

* * * * *